US010032531B2

United States Patent
Okamura et al.

(10) Patent No.: US 10,032,531 B2
(45) Date of Patent: Jul. 24, 2018

(54) CHEMICAL SOLUTION INJECTION SYSTEM AND CHEMICAL SOLUTION INJECTION METHOD

(71) Applicant: Kabushiki Kaisha Toshiba, Minato-ku (JP)

(72) Inventors: Masato Okamura, Yokohama (JP); Tetsuo Oosato, Sumida (JP); Seiji Yamamoto, Setagaya (JP); Hiroyuki Arai, Kamakura (JP); Osamu Shibasaki, Yokohama (JP); Koji Negishi, Kawasaki (JP); Hiromichi Koga, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 847 days.

(21) Appl. No.: 14/587,223

(22) Filed: Dec. 31, 2014

(65) Prior Publication Data

US 2016/0372219 A1  Dec. 22, 2016

(30) Foreign Application Priority Data

Jan. 21, 2014 (JP) .................................. 2014-009033

(51) Int. Cl.
*B01D 35/18* (2006.01)
*F16K 49/00* (2006.01)
(Continued)

(52) U.S. Cl.
CPC .......... *G21C 17/0225* (2013.01); *C23F 11/00* (2013.01); *C23F 11/187* (2013.01);
(Continued)

(58) Field of Classification Search
CPC ..................................................... A61L 2/14
(Continued)

(56) References Cited

U.S. PATENT DOCUMENTS 4,968,478 A * 11/1990 Burda ..................... C23F 11/08
376/306

FOREIGN PATENT DOCUMENTS

JP  2005-207936 A     8/2005
JP  2011-163828   *   8/2011   ............... G21D 3/08

OTHER PUBLICATIONS

Japanese Patent Office English Translation of JP 2011-163828 (Detailed Description).*

(Continued)

*Primary Examiner* — Monzer R Chorbaji
(74) *Attorney, Agent, or Firm* — Oblon, McClelland, Maier & Neustadt, L.L.P.

(57) ABSTRACT

A chemical solution injection system 30 of an embodiment includes: a chemical solution reservoir 31 that stores a chemical solution containing a depositing substance to deposit to a member in contact with cooling water for absorbing heat in a plant; a pipe 32 through which the chemical solution passes; a first heat exchanger and a second heat exchanger that exchange heat between the cooling water and the chemical solution; a cooling water pipe 49 which connects the heat exchangers in series and in which the cooling water passes; and a pump 34 that conveys the chemical solution. The temperature of the chemical solution in the chemical solution reservoir 31 is lower than that of the cooling water. The pipe 32 sequentially connects the chemical solution reservoir 31, the first heat exchanger, the second heat exchanger and the plant. The cooling water guided from the inside of the plant passes through the second heat exchanger and subsequently passes through the first heat exchanger. The chemical solution passes through the first heat exchanger and subsequently passes through the second heat exchanger.

9 Claims, 4 Drawing Sheets

(51) Int. Cl.
*B01D 11/02* (2006.01)
*B01J 19/00* (2006.01)
*G21C 17/022* (2006.01)
*G21C 19/28* (2006.01)
*C23F 11/00* (2006.01)
*C23F 11/18* (2006.01)
*F22B 37/02* (2006.01)
*F22B 37/04* (2006.01)

(52) U.S. Cl.
CPC ............ *F22B 37/025* (2013.01); *F22B 37/04* (2013.01); *G21C 19/28* (2013.01); *G21Y 2002/103* (2013.01); *G21Y 2004/20* (2013.01)

(58) Field of Classification Search
USPC .... 422/28, 41, 255, 261, 307; 210/764, 175; 137/334
See application file for complete search history.

(56) References Cited

OTHER PUBLICATIONS

Extended European Search Report dated Jun. 2, 2015 in European Patent Application No. 15150426.3.

\* cited by examiner

CHEMICAL SOLUTION INJECTION SYSTEM AND CHEMICAL SOLUTION INJECTION METHOD

BACKGROUND OF THE INVENTION

Field of the Invention

Embodiments of the present invention relate to a chemical solution injection system and a chemical solution injection method.

Description of the Related Art

In thermal power stations and nuclear power stations, cooling water is circulated, absorbs heat generated in the power stations and comes to have a high temperature thereby. In high-temperature water, metal materials are vulnerable to corrosion. Accordingly, in plants, such as thermal power stations and nuclear power stations, where cooling water at a high temperature is circulated, it is important to secure the integrity of metal materials exposed to cooling water. For instance, it has been known that stress corrosion cracking occurs at portions of metal exposed to cooling water in nuclear power stations. Stress corrosion cracking is a phenomenon where when an alloy member subjected to a stress is placed in a corrosive environment, such as high-temperature water, cracks occur in the alloy member and the cracks rapidly develop.

Development of cracks due to stress corrosion cracking in cooling water at a high temperature can be suppressed by reducing the corrosion potential at a metal surface exposed to the cooling water. Types of measures for reducing the corrosion potential at a metal surface exposed to cooling water include measures for causing precious metal, such as platinum (Pt), or oxide, such as titanium oxide ($TiO_2$), to deposit to the metal surface. Such a substance depositing to members exposed to cooling water is referred to as a depositing substance.

Measures for causing the depositing substance to deposit to a metal surface exposed to cooling water in a plant include measures for injecting a chemical solution containing the depositing substance into cooling water. A depositing substance component of the chemical solution injected into the cooling water deposits to metal portions in contact with the cooling water during a process of circulation of the cooling water in the plant.

Such measures are disclosed in Japanese Patent Laid-Open No. 2011-163828.

In order to provide a corrosion suppressing effect due to the depositing substance for metal surfaces exposed to cooling water in the plant, at least a prescribed amount of depositing substance is required to deposit to the metal surfaces exposed to the cooling water. Deposition of at least the prescribed amount of depositing substance to the metal surfaces exposed to the cooling water requires at least a prescribed concentration of the depositing substance contained in the cooling water.

Unfortunately, in the case of injecting a chemical solution containing the depositing substance, the chemical solution typically has a lower temperature than the cooling water has, thus causing a difference in temperature between the cooling water and the chemical solution. Accordingly, the temperature of the chemical solution injected into the cooling water sharply rises. The sharp rise in temperature accelerates deposition of the depositing substance, causing a possibility that the depositing substance deposits to some portions excessively. Such deposition excessively reduces the depositing substance concentration in the cooling water to a prescribed concentration or less, causing a possibility that the depositing substance does not sufficiently deposit to some other portions.

SUMMARY OF THE INVENTION

The present invention therefore has an object to provide a chemical solution injection system and a chemical solution injection method that are capable of causing at least a prescribed amount of depositing substance to deposit to metal surfaces exposed to cooling water which is to become a high temperature.

In order to achieve the foregoing objects, a chemical solution injection system of an embodiment includes: a chemical solution reservoir which stores a chemical solution containing a depositing substance to deposit to a member in contact with cooling water circulating in a plant and having a lower temperature than the cooling water has; a pipe through which the chemical solution supplied from the chemical solution reservoir passes; a plurality of heat exchangers which exchange heat between the cooling water and the chemical solution passing through the pipe; a cooling water pipe which connects the heat exchangers in series and through which the cooling water guided from an inside of the plant flows; and a pump which conveys the chemical solution through the pipe, wherein the chemical solution flows in an order of the chemical solution reservoir, the heat exchanger on an upstream side, the heat exchanger on a downstream side, and the plant, and the cooling water passes through in an order of the heat exchanger on the downstream side and the heat exchanger on the upstream side while heating the chemical solution to reduce a difference in temperature between the chemical solution and the cooling water.

In order to achieve the foregoing objects, a chemical solution injection method including: a step of storing a chemical solution containing a depositing substance to deposit to a member in contact with cooling water circulating in a plant and having a lower temperature than the cooling water has; a step of causing the chemical solution to flow in an order of a chemical solution reservoir, a pipe communicating with the chemical solution reservoir, a heat exchanger on an upstream side and a heat exchanger on a downstream side among a plurality of heat exchangers connected to each other in series, and the plant; a step of causing the cooling water to pass through in an order of the heat exchanger on the downstream side and the heat exchanger on the upstream side while heating the chemical solution to reduce a difference in temperature between the chemical solution and the cooling water; and a step of injecting the heated chemical solution into the cooling water in the plant.

DETAILED DESCRIPTION OF THE
PREFERRED EMBODIMENTS

Embodiments of the present invention are hereinafter described with reference to the drawings.

First Embodiment

Figure 1:
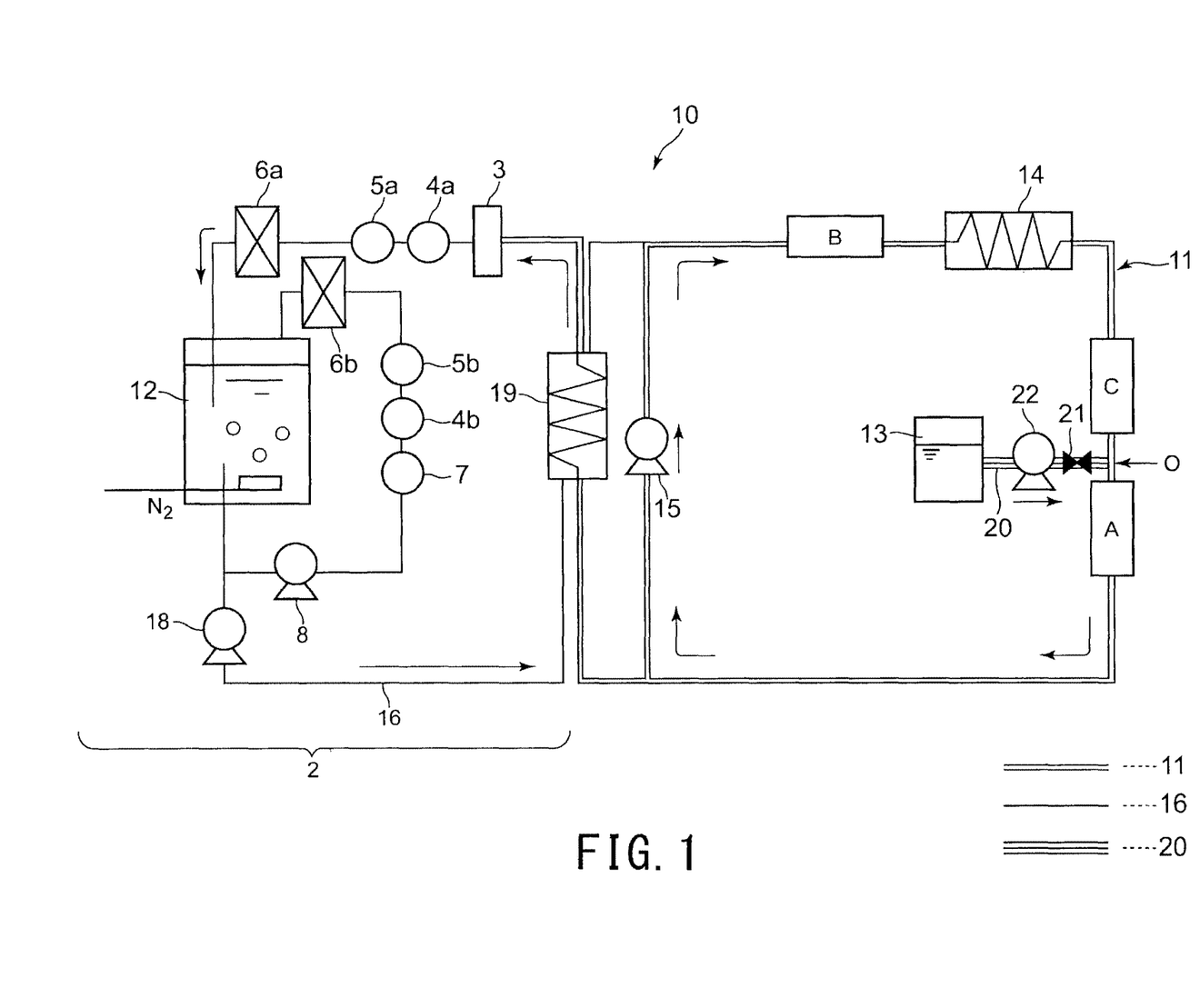
FIG. 1 is a schematic diagram of a deposition testing instrument for a depositing substance in a nuclear power plant.
Figure 2:
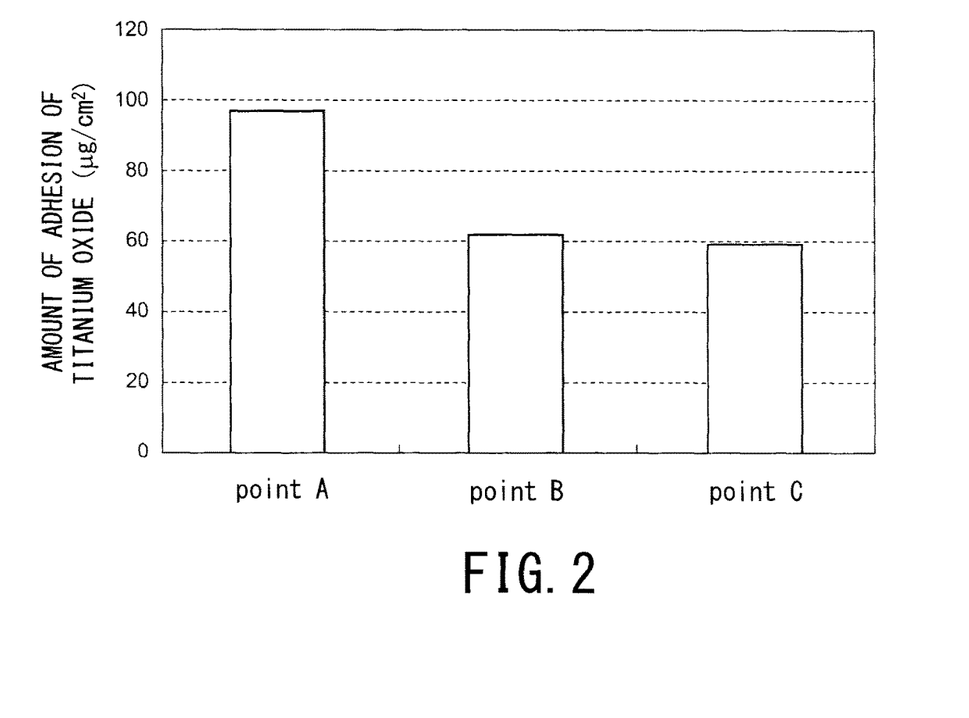
FIG. 2 is a graph showing an amount of deposition of the depositing substance at a depositing substance concentration of 10 ppm and a water temperature of 200° C.
Figure 3:
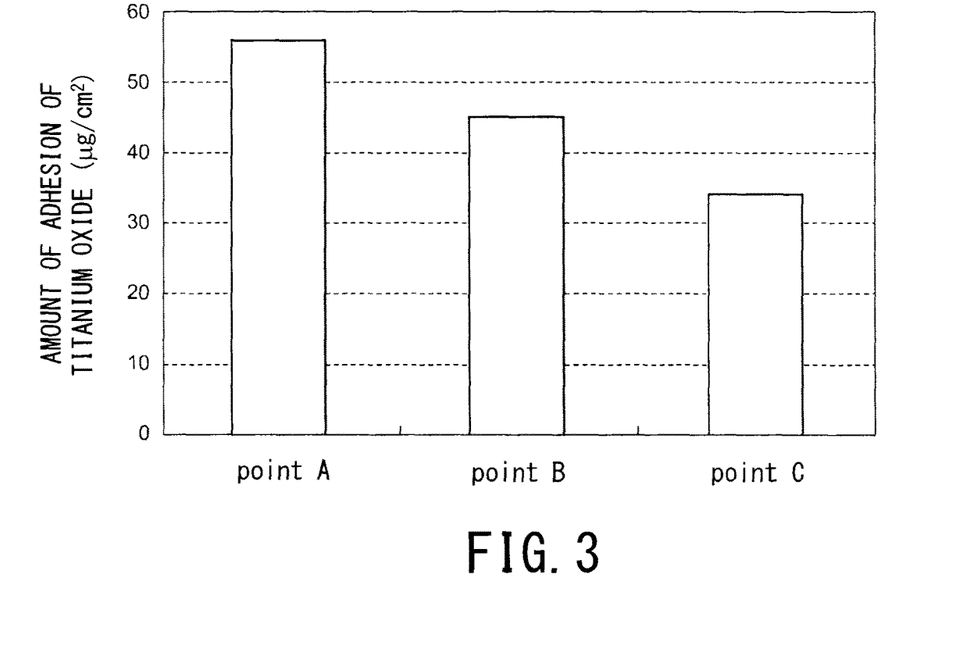
FIG. 3 is a graph showing the amount of deposition of the depositing substance at a depositing substance concentration of 0.1 ppm and a water temperature of 280° C.
Figure 4:
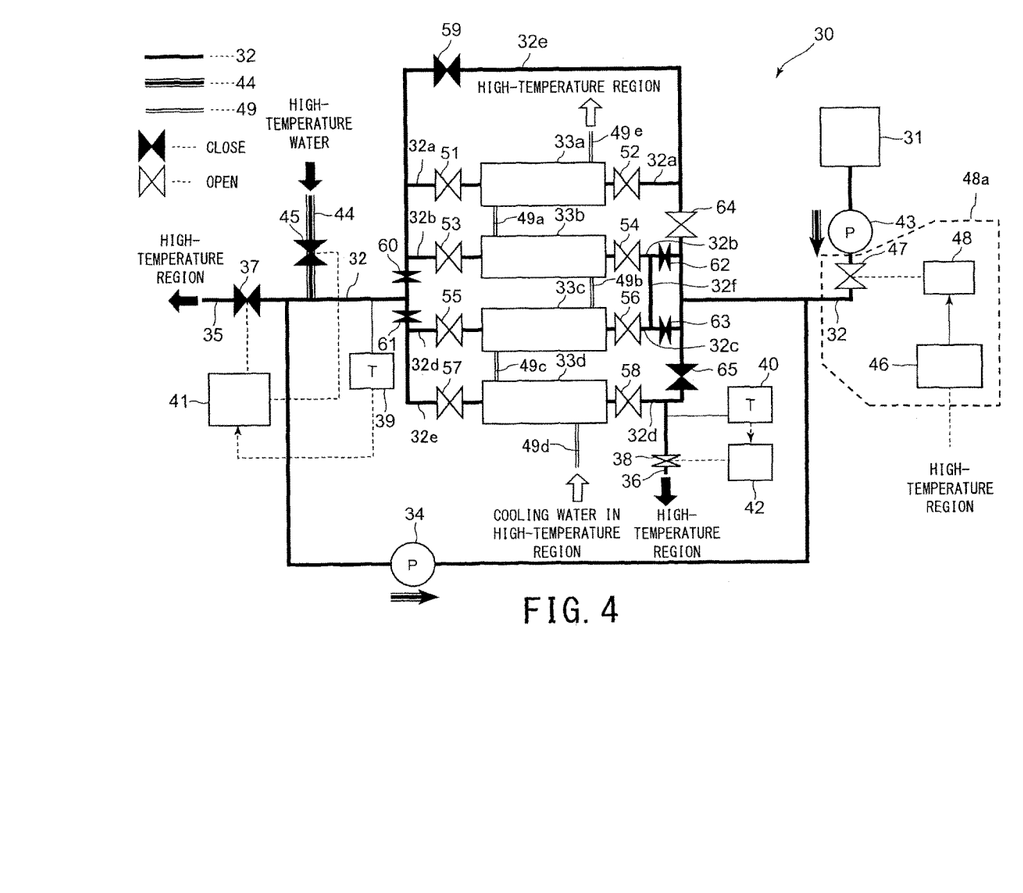
FIG. 4 is a schematic diagram of a chemical solution injection system according to a first embodiment.
Figure 5:
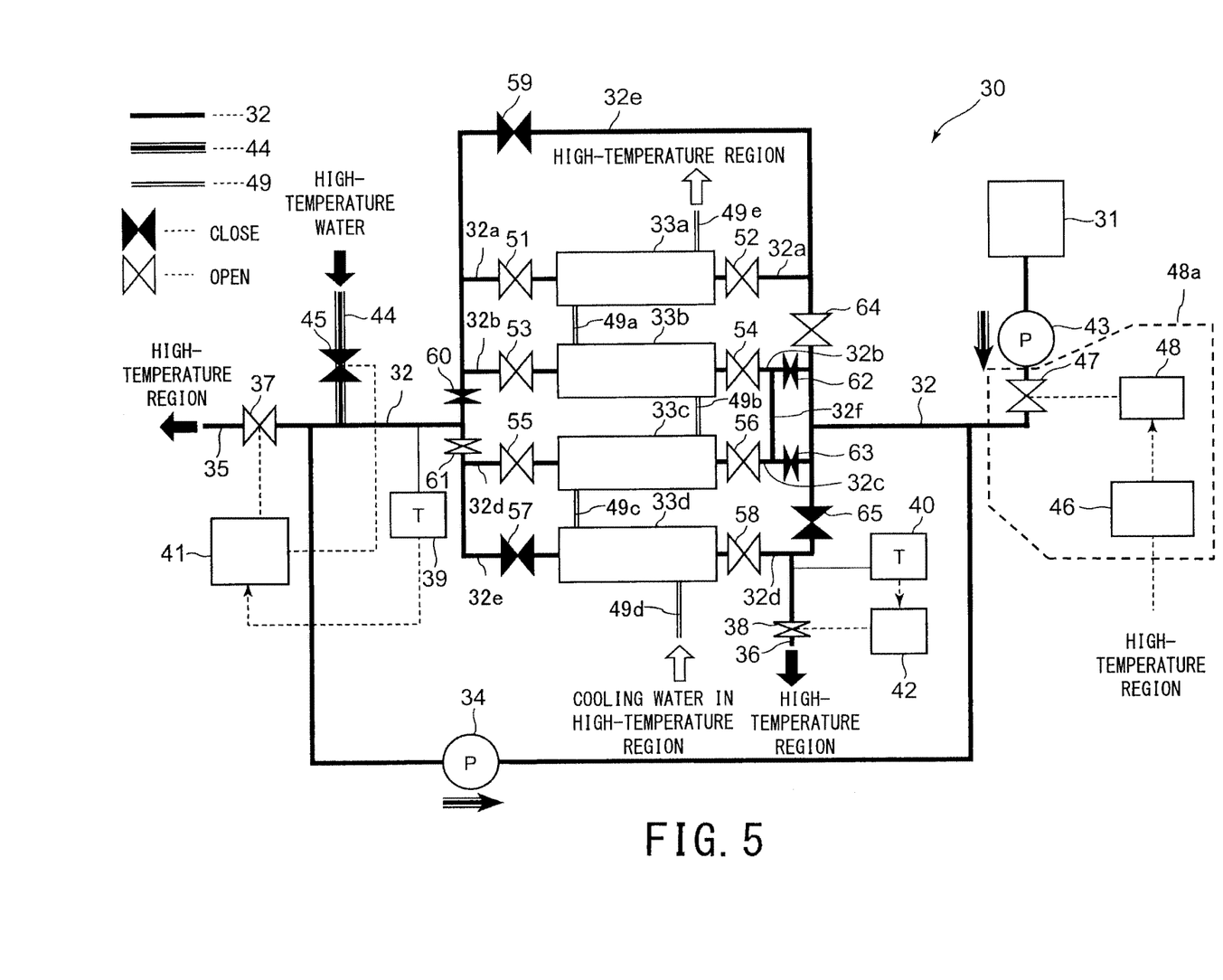
FIG. 5 is a schematic diagram of a variation of the chemical solution injection system of the first embodiment.

A first embodiment is described with reference to FIGS. 1 to 5. FIG. 1 is a schematic diagram of a deposition testing instrument for a depositing substance in a nuclear power plant. FIG. 2 is a graph showing an amount of deposition of the depositing substance at a depositing substance concentration of 10 ppm and a water temperature of 200° C. FIG. 3 is a graph showing the amount of deposition of the depositing substance at a depositing substance concentration of 0.1 ppm and a water temperature of 280° C. FIG. 4 is a schematic diagram of a chemical solution injection system according to the first embodiment. FIG. 5 is a schematic diagram of a variation of the chemical solution injection system of the first embodiment.

In this embodiment, the cooling water circulates in nuclear power stations and thermal power stations, absorbs heat generated in the stations to a high temperature of at least 100° C. Liquid that contains a depositing substance and is to be injected into the cooling water circulating in the plant is referred to as a chemical solution. In this embodiment, it is assumed that the depositing substance is $TiO_2$, and the chemical solution is $TiO_2$ colloidal solution.

(Amount of Deposition of Depositing Substance in Nuclear Power Plant)

FIG. 1 shows a simulation apparatus 10, which is a deposition testing instrument for simulating the condition of an actual nuclear power plant and measuring the amount of deposition of the depositing substance. The simulation apparatus 10 includes a main pipe 11 that allows water to internally pass therethrough, a water supply system 2 that supplies water for the main pipe 11, and a chemical solution tank 13 that stores a chemical solution to be injected into the main pipe 11.

The main pipe 11 has a loop configuration for allowing water to internally circulate therethrough, and is provided with a heater 14 to cause the water temperature to approach a temperature equivalent to that of cooling water in a power plant in operation. The heater 14 heats the water circulating in the main pipe 11 to keep this water at a temperature equivalent to that of the cooling water. The main pipe 11 is provided with a main pipe pump 15. The main pipe pump 15 circulates the water in the main pipe 11. The main pipe 11 branches upstream of the main pipe pump 15, and communicates with a heat exchanger 19 and joins into the water supply system 2.

The chemical solution tank 13 and the main pipe 11 communicate with each other through a chemical solution supply pipe 20. The chemical solution supply pipe 20 is provided with a chemical solution supply control valve 21 and a chemical solution supply pump 22. The chemical solution supply control valve 21 is a valve for controlling the amount of chemical solution supply from the chemical solution tank 13 to the main pipe 11. The chemical solution supply pump 22 is a pump for conveying the chemical solution from the chemical solution tank 13 to the main pipe 11.

The water supply system 2 includes a water supply pipe 16, a water tank 12, and the heat exchanger 19. The water supply pipe 16 connects the water tank 12 to the heat exchanger 19. The water supply pipe 16 connects the heat exchanger 19 to the main pipe 11 at the downstream of the circulation pump 15. The water supply system 2 and the main pipe 11 communicate with each other through the heat exchanger 19. Water flowing into the heat exchanger 19 from the main pipe 11 branched upstream of the circulation pump 15 is supplied to the water tank 12. Water flowing from the water tank 12 into the heat exchanger 19 through the water supply pipe 16, in turn, flows into the main pipe 11 at the downstream of the circulation pump 15.

In the heat exchanger 19, water supplied from the water tank 12 absorbs heat from high-temperature water supplied from the main pipe 11 to have a temperature approaching the water temperature in the main pipe 11 and then flows into the main pipe 11. The water, flowing from the main pipe 11 into the heat exchanger 19 and reducing the temperature through heat exchange, further passes through a cooler 3 to have a temperature equivalent to ambient temperature, and supplied to the water tank 12. The water supply pipe 16 connecting the cooler 3 to the water tank 12 is supplied with a dissolved hydrogen meter 4a and a dissolved oxygen meter 5a and an ion exchanger 6a, and controls the quality of water supplied to the water tank 12.

A high pressure pump 18 is supplied at the middle of the water supply pipe 16, which connects the water tank 12 to the heat exchanger 19. The high pressure pump 18 conveys the water from the water tank 12 into the main pipe 11 through the heat exchanger 19. The water supply pipe 16 branches upstream of the high pressure pump 18, and communicates with the water tank 12. A path of the water supply pipe 16, which branches upstream of the high pressure pump 18 and communicates with the water tank 12, is provided with a pump 8, a conductivity meter 7, a dissolved hydrogen meter 4b, a dissolved oxygen meter 5b and an ion exchanger 6b, and monitors the quality of water supplied from the water tank 12 to the main pipe 11. The pump 8 guides a part of water supplied to the heat exchanger 19, to the branched path of the water supply pipe 16. The water tank 12 is supplied with gas, such as nitrogen ($N_2$), which keep the quality of water in the water tank 12 close to that of cooling water.

FIG. 1 shows monitor spots A to C for detecting the amount of depositing substance. At each monitor spot, a metal piece is provided, for example, and the amount of depositing substance that deposits to the metal piece is measured. In order to cause the flow velocity around the monitor spots to approach that of cooling water circulating in a nuclear power plant, the inner diameter of the main pipe 11 at each monitor spot is configured to be narrow, which locally increases the flow velocity. The water in the main pipe 11 has a constant temperature of 200° C., and the flow velocities at the monitor spots are 2 m/s. The chemical solution in the chemical solution tank 13 has an ordinary temperature of 25° C. At a point O, the chemical solution is injected into the main pipe 11. At the point A, the water having passed the point O passes one second later. At the point B, the water having passed through the point O passes 30 seconds later. At the point C, the water having passed through the point O passes 240 seconds later.

At the points O and A, the temperatures of chemical solution sharply rise; it is assumed that the temperatures change at a velocity of 175° C./s at the maximum. Meanwhile, at the points B and C, which are relatively apart from the point O, the temperatures of chemical solution are substantially identical to the temperature of water flowing through the main pipe 11; it is assumed that almost no temperature change occurs.

FIG. 2 shows a result of measurement where a prescribed amount of chemical solution was continued to be injected at the point O, and the degrees of deposition of the depositing substance were measured at the points A to C, 24 hours after the start of injecting the chemical solution. It is assumed that the depositing substance concentration in the water circulating in the main pipe 11 is kept to 10 ppm. At the point A, an amount of deposition of the depositing substance of at least 95 μg/cm$^2$ was identified. At the points B and C, an amount of deposition of the depositing substance of about 60 μg/cm$^2$ was identified.

Based on the above result, it can be understood that the deposition speed of depositing substance is accelerated at a part where the temperature of the chemical solution is sharply rising. Meanwhile, it can be understood that, at the points B and C where almost no temperature change occurs, the deposition speeds are constant and prescribed amounts of depositing substance deposit.

Next, FIG. 3 shows the amount of deposition of depositing substance in the nuclear power plant in the case where the concentration of the depositing substance in cooling water is low. FIG. 3 shows a result of measurement where in the simulation apparatus 10 shown in FIG. 1, the water in the main pipe 11 was kept to have a temperature of 280° C., the chemical solution was continued to be injected at a constant flow rate from the point O such that the depositing substance concentration of water circulating in the main pipe 11 can be 0.1 ppm, and the degrees of deposition of depositing substance were measured at the points A to C, 24 hours after the start of injecting chemical solution. The other conditions are the same as those in FIG. 2.

At the point A, an amount of deposition of the depositing substance of 56 μg/cm$^2$ was identified. At the point B, an amount of deposition of the depositing substance of 45 μg/cm$^2$ was identified. At the point C, deposition of the depositing substance of 34 μg/cm$^2$ was identified.

Based on the above result, it can be understood that even in the case of the low concentration of depositing substance, the deposition speed of depositing substance is accelerated at the part where the temperature of chemical solution is sharply rising, as with the case in FIG. 2. Furthermore, in the case of the low concentration of depositing substance, although almost no temperature change occurs at the points B and C, the amount of deposition decreases in an order of the points B and C. Accordingly, the following is estimated.

Since the depositing substance deposits to the inner surface of the main pipe 11 and each monitor spot, the depositing substance concentration decreases from the upstream to downstream sides. In the test shown in FIG. 3, at least at the points B and C, the depositing substance concentrations become a prescribed concentration or less. It is assumed that, even though almost no temperature change occurs, the concentration gradient of depositing substance causes a difference between the amounts of deposition of depositing substance.

That is, the chemical solution is preliminarily heated to reduce the difference in temperature from the cooling water, and sharp increase in temperature of the chemical solution is suppressed, which can in turn suppress sharp increase in deposition speed of the depositing substance. The sharp reduction in the depositing substance concentration in the cooling water is suppressed, which can suppress the depositing substance concentration not to become a prescribed concentration or less. As a result, parts of the metal surface that are exposed to the cooling water in the plant and have an insufficient amount of deposition of the depositing substance can be reduced.

Furthermore, when the chemical solution is heated before being injected into the cooling water, sharp increase in temperature of the chemical solution is suppressed, which can prevent the depositing substance from depositing to a heating device and the like, and suppress reduction in depositing substance concentration in the chemical solution. Accordingly, the chemical solution having a higher concentration can be injected into the cooling water, and the depositing substance concentration in the cooling water can be increased higher. As a result, reduction in depositing substance concentration is suppressed not to become a prescribed concentration or less, and parts of the metal surface that are exposed to the cooling water in the plant and have an insufficient amount of deposition of the depositing substance can be reduced.

The concentration of the depositing substance in cooling water that is sufficient to supply a corrosion suppressing effect to the metal surface exposed to the cooling water in the plant is appropriately set according to the conditions of the material type of the depositing substance and the cooling water flowing in the plant.

(Configuration)

Next, the configuration of the chemical solution injection system 30 of this embodiment is described. The chemical solution injection system 30 has a function of increasing the temperature of the chemical solution before injecting the chemical solution into the cooling water circulating in the plant. The chemical solution injection system 30 includes a chemical solution reservoir 31 that stores the chemical solution, a chemical solution pipe 32 through which the chemical solution supplied from the chemical solution reservoir 31 passes, heat exchangers 33a to 33d that exchange heat between the cooling water and the chemical solution, and a circulation pump 34 that conveys the chemical solution through the chemical solution pipe 32. The chemical solution pipe 32 communicates at confluence sections 35 and 36 with a region where the cooling water flows in the plant. FIG. 4 shows the region where the cooling water flows in the plant as a high temperature region. The cooling water in the high temperature region absorbs heat generated in the plant to have a high temperature.

The chemical solution stored in the chemical solution reservoir 31 has a lower temperature than the cooling water in the high temperature region has; for instance, the solution has an ambient temperature. A chemical solution pump 43 is provided downstream of the chemical solution reservoir 31; this pump is for drawing the chemical solution in the chemical solution reservoir 31 into the chemical solution pipe 32. The multiple heat exchangers 33a to 33d, the chemical solution reservoir 31, and the circulation pump 34 communicate with each other through the chemical solution pipe 32.

The multiple heat exchangers 33 are connected to each other by a cooling water pipe 49 where the cooling water passes and the chemical solution pipe 32. The cooling water pipe 49 sequentially communicates with the heat exchangers 33a to 33d. The cooling water flows from the heat exchanger 33d and passes through the heat exchangers 33c, 33b and 33a entirely in this order.

Meanwhile, the chemical solution pipe 32 also sequentially communicates with the heat exchangers 33a to 33d. In FIG. 4, the chemical solution flows from the heat exchanger 33a and passes through the heat exchangers 33b, 33c and 33d entirely in this order. The order of the chemical solution passing through the heat exchangers 33a to 33d is inverted from the order of the cooling water passing through the heat exchangers 33a to 33d.

The chemical solution pipe 32 communicates with pipes 32a to 32d so as to allow the chemical solution to pass through the respective heat exchangers 33a to 33d in parallel. The relationship between the chemical solution pipe 32 and the pipes 32a to 32d is hereinafter described. The chemical solution pipe 32 is branched into the pipe 32a, the pipe 32b, the pipe 32c, the pipe 32d, a bypass pipe 32e, and a bypass pipe 32f, which join together at a prescribed position again. The opposite ends of the heat exchanger 33a, the heat exchanger 33b, the heat exchanger 33c and the heat exchanger 33d are connected to the pipe 32a, the pipe 32b, the pipe 32c and the pipe 32d, respectively.

The pipes 32a to 32d connected to the opposite ends of the heat exchangers 33a to 33d are provided with valves. The pipe 32a connected to the opposite ends of the heat exchanger 33a is provided with valves 51 and 52. The pipe 32b connected to the opposite ends of the heat exchanger 33b is provided with valves 53 and 54. The pipe 32c connected to the opposite ends of the heat exchanger 33c is provided with valves 55 and 56. The pipe 32d connected to the opposite ends of the heat exchanger 33d is provided with valves 57 and 58. Each of the valves 51 to 58 can block the inflow of the chemical solution into the corresponding heat exchanger. In FIG. 4, the right side on the sheet with respect to the heat exchangers 33a to 33d is referred to as an upstream part, and the left side of the heat exchangers 33a to 33d with respect to the heat exchangers 33a to 33d is referred to as a downstream part. The valves 52, 54, 56 and 58 are provided on the upstream side of the heat exchangers 33a to 33d. The valves 51, 53, 55 and 57 are provided on the downstream side of the heat exchangers 33a to 33d.

The bypass pipe 32e allows the chemical solution to pass therethrough for bypassing the heat exchangers 33a to 33d and circulating in the chemical solution injection system 30. The bypass pipe 32e is provided with a valve 59 that blocks the chemical solution in the bypass pipe 32e.

The bypass pipe 32f is a pipe through which the pipes 32b and 32c communicate with each other. The bypass pipe 32f connects a point on the pipe 32b upstream of the valve 54 to a point on the pipe 32c upstream of the valve 56. A valve 62 is provided for the pipe 32b upstream of the bypass pipe 32f. A valve 63 is provided for the pipe 32c upstream of the bypass pipe 32f. Each of the valves 62 and 63 can block passing of the chemical solution in the pipes 32b and 32c, respectively.

A valve 64 is provided between the pipes 32a and 32b on the upstream side. A valve 65 is provided between the pipes 32c and 32d on the upstream side.

A valve 60 is provided downstream of the valve 53 on the pipe between the pipe 32b and the chemical solution pipe 32 on the downstream side where all the pipes 32a to 32b and 32e join together. A valve 61 is provided downstream of the valve 55 on the pipe between the pipe 32c and the chemical solution pipes 32 on the downstream side where all the pipes 32a to 32b and 32e join together.

Control of opening and closing of these valves 51 to 65 enables the chemical solution to pass through the heat exchangers 33a to 33d in this order, and the chemical solution to pass in parallel to the respective heat exchangers, and the heat exchanger through which the chemical solution is pass to be selected. It is assumed that all the valves 51 to 65 are connected to a chemical solution path controller, not shown. The chemical solution path controller controls opening and closing of the valves 51 to 65 according to the temperature in the chemical solution pipe 32 and the concentration of the depositing substance.

For the sake of illustration, the right side on the sheet with respect to the heat exchangers 33a to 33d is referred to as the upstream part, and the left side of the heat exchangers 33a to 33d with respect to the heat exchangers 33a to 33d is referred to as the downstream part. However, the flow path of the chemical solution appropriately changes according to opening and closing of the valves 51 to 65. Accordingly, in some cases of opening and closing of the valves 51 to 65, the right side on the sheet with respect to the heat exchangers 33a to 33d may be the downstream side and the left side on the sheet of the heat exchangers 33a to 33d may be the upstream side.

The chemical solution pipe 32 is provided with chemical solution injection control valves 37 and 38 that control the chemical solution flowing from the confluence sections 35 and 36 into the cooling water, and thermometers 39 and 40 that measure the temperature of the chemical solution flowing in the chemical solution pipe 32. Chemical solution injection controllers 41 and 42 control opening and closing of the chemical solution injection control valves 37 and 38 on the basis of measurement by the thermometers 39 and 40. The chemical solution injection control valve 37 and thermometer 39 are connected to the chemical solution injection controller 41. The chemical solution injection control valve 38 and thermometer 40 are connected to the chemical solution injection controller 42.

The chemical solution injection control valves 37 and 38 and thermometers 39 and 40 are provided on, for instance, the chemical solution pipe 32 downstream of the heat exchangers 33a to 33d and upstream of the confluence sections 35 and 36. Thermometers 39 and 40 measure the chemical solution downstream of the heat exchangers 33a to 33d and upstream of the confluence sections 35 and 36.

When the chemical solution injection controller 41 detects that the measured value of thermometer 39 becomes a value preset in the chemical solution injection controller 41, this controller opens the chemical solution injection control valve 37 to inject the chemical solution into the high temperature region. Likewise, when the chemical solution injection controller 42 detects that the measured value of thermometer 40 becomes a value preset in the chemical solution injection controller 42, this controller opens the chemical solution injection control valve 38 to inject the chemical solution into the high temperature region.

The values set in the chemical solution injection controllers 41 and 42 are the temperatures of the chemical solution where even sharp increase in temperature of the chemical solution injected into the coolant does not sharply reduce the depositing substance concentration in the cooling water. For instance, in the case where the depositing substance is $TiO_2$, if the difference in temperature between the chemical solution and the cooling water is 50° C. or less at the time when the chemical solution is injected into the cooling water, it is assumed that the deposition speed of the depositing substance does not sharply change.

For instance, in the case where the chemical solution is $TiO_2$ colloidal solution and the depositing substance in the cooling water circulating in the high temperature region is kept to 10 ppm and where the chemical solution is heated such that the temperature change of the chemical solution injected into the cooling water is 10° C./s or less, it is assumed that the depositing substance concentration in the cooling water does not sharply decrease. The value of 10° C./s is derived from the test result in FIG. 2.

In the test in FIG. 2, the amount of deposition of the deposition substance at the point B is an amount sufficient to prevent corrosion. Here, the temperature change from the point A to the point B is (200–25)° C./30 s=5.8° C./s. Furthermore, in actuality, it is assumed that the chemical solution has already been in a state substantially identical to that of the cooling water at a point apart by 15 seconds from the point A. Accordingly, if the temperature change is 10° C./s, which is about twice as much as the temperature change from the point A to the point B, it is assumed that the parts where the amount of deposition of the depositing substance is insufficient on the metal surface exposed to the cooling water in the plant can be reduced.

(Operation)

Next, the operation of the chemical solution injection system 30 of this embodiment is described. The chemical solution injection system 30 before starting operation is blocked from the high temperature region, and the chemical solution injection control valves 37 and 38 are closed. The valves 59, 60 and 64 are opened and the valves 51 to 58, 62, 63 and 65 are closed. The chemical solution pipe 32 is filled with pure water. Although pipes and the like for supplying the pure water into the chemical solution pipe 32 are not shown, the pure water is appropriately supplied into the chemical solution pipe 32, and the flow rate in the chemical solution pipe 32 in operation is kept to a prescribed value.

The chemical solution in the chemical solution reservoir 31 is drawn by the chemical solution pump 43 into the chemical solution pipe 32, passes through the bypass pipe 32e, and circulates in the chemical solution injection system 30 by the circulation pump 34. The chemical solution is adjusted to have a depositing substance concentration of the prescribed value while circulating in the chemical solution injection system 30.

When the depositing substance concentration in the chemical solution pipe 32 becomes the prescribed value, the chemical solution path controller, not shown, performs control such that the valves 59, 60 to 63 and 65 are closed and the valves 51 to 58 and 64 are opened as described in FIG. 4. The chemical solution whose concentration becomes the prescribed concentration sequentially flows through the heat exchangers 33a to 33d.

Here, the cooling water flows into the heat exchanger 33d among the heat exchangers through the cooling water pipe 49, and passes sequentially through the heat exchangers 33c, 33b and 33a. Accordingly, the temperature of the cooling water passing through the heat exchangers 33a to 33d decreases from the heat exchanger 33d to the exchanger 33a. That is, the temperature of cooling water that exchanges heat with the chemical solution at the heat exchangers gradually increases from the heat exchanger 33a to the exchanger 33d. Accordingly, the temperature of chemical solution increases stepwise while the solution passing from the heat exchanger 33a to the exchanger 33d.

The thermometer 40 then measures the temperature of the chemical solution. If the chemical solution reaches a sufficient temperature, the chemical solution injection controller 41 opens the chemical solution injection control valve 38 to allow the chemical solution to flow from the confluence section 36 to the high temperature region. If the chemical solution does not reach the sufficient temperature, the chemical solution injection control valve 38 is kept closed. The valves 51 to 65 are then operated to allow the solution to pass through the heat exchangers 33a to 33d again.

The chemical solution injection system 30 of this embodiment can change the path where the chemical solution passes, by controlling the valves 51 to 65. In the case where a small increase in temperature of the chemical solution is sufficient, the temperature of the chemical solution can be adjusted by a configuration with a reduced number of heat exchangers where the chemical solution passes. In the case where the amounts of heat supplied to the chemical solution by the heat exchangers are different between the heat exchangers, selection of the heat exchanger where the chemical solution passes allows the temperature of the chemical solution to be adjusted.

For instance, in the case where not much increase in temperature of the chemical solution is required, the valves 57, 59, 60, 62, 63 and 65 are closed, the valves 51 to 56, 61 and 64 are opened and the chemical solution injection control valve 37 is opened, as shown in FIG. 5. The flow of the chemical solution into the fourth heat exchanger is thus blocked, and the chemical solution flows from the heat exchanger 33a passes through the exchangers 33b and 33c, and is then injected into the high temperature region at the confluence section 35.

Advantageous Effects

The chemical solution injection system 30 of this embodiment can preliminarily heat the chemical solution to reduce the difference in temperature from the cooling water. This reduction can suppress sharp increase in temperature of the chemical solution in the cooling water. Accordingly, sharp increase in deposition speed of the depositing substance can be suppressed. Sharp reduction in depositing substance concentration in the cooling water can be suppressed. The depositing substance concentration can be suppressed not to be the prescribed concentration or less. The depositing substance can therefore deposit efficiently to the metal surface exposed to the cooling water in the plant.

The multiple heat exchangers of the chemical solution injection system 30 in this embodiment can suppress sharp increase in temperature of the chemical solution during heating the chemical solution, thereby allowing sharp increase in deposition speed of the depositing substance to be suppressed. Accordingly, the depositing substance is prevented from depositing to the heating device and the like, and reduction in depositing substance concentration in the chemical solution can be suppressed. The depositing substance concentration in the cooling water can thus be increased, thereby allowing the depositing substance to efficiently deposit to the metal surface exposed to the cooling water in the plant.

What supplies the amount of heat to the chemical solution in the heat exchanger may be something other than the cooling water. Any element that absorbs heat generated in the plant, for instance, steam may be adopted.

The number of heat exchangers is not limited to four. The number thereof is appropriately configured according to the difference in temperature between the chemical solution and the high temperature region, the characteristics of depositing substance and the like.

In this embodiment, the confluence sections are thus provided at two spots. This configuration is for support various circulation paths of the chemical solution in the chemical solution injection system 30. In a certain circulation path, the confluence section may be provided at one spot or three or more spots.

The chemical solution injection system 30 may be provided with a cooling water introducing pipe 44 that allows a part of cooling water to flow into the chemical solution pipe 32, and a cooling water inlet control valve 45 that controls the inflow rate from the cooling water introducing pipe 44 into the chemical solution pipe 32. The cooling water inlet control valve 45 is connected to a cooling water introducing controller, not shown. The cooling water introducing controller controls opening and closing of the cooling water introducing control valve on the basis of the measured value of thermometer 39 or 40. The temperature of the chemical solution can be rapidly increased by causing the cooling water to flow into the chemical solution. Also in this case, adjustment is required to eliminate temperature change of the chemical solution that accelerates the deposition speed of the depositing substance.

The function of the cooling water introducing controller may be provided for the chemical solution injection controller 41 or 42. In FIGS. 4 and 5, the function of the cooling water introducing controller is achieved by the chemical solution injection controller 41.

Second Embodiment

A second embodiment is described. The same symbols are assigned to the same configuration elements as those of the first embodiment. Redundant description is omitted.
(Configuration)

The chemical solution injection system 30 of this embodiment includes a concentration measurement unit 46 that measures the concentration of the chemical solution in the cooling water in the high temperature region, and a controller for the amount of supply that controls the amount of chemical solution supply from the chemical solution reservoir 31 to the chemical solution pipe 32 on the basis of detection by the concentration measurement unit 46. The controller for the amount of supply keeps constant the concentration of the chemical solution in the cooling water so as not to change the amount of deposition of the depositing substance according to the position from the confluence section owing to reduction in concentration in chemical solution in the cooling water. The controller for the amount of supply may be, for instance, a valve 47 for controlling the amount of chemical solution supply that controls the amount of chemical solution drawn from the chemical solution reservoir 31 to the chemical solution pipe 32, and a controller 48 for the amount of chemical solution supply that controls opening and closing of the valve 47 for controlling the amount of chemical solution supply on the basis of detection by the concentration measurement unit 46.

Advantageous Effect

As with the first embodiment, the chemical solution injection system 30 of the second embodiment preliminarily heats the chemical solution to reduce the difference in temperature from the cooling water, thereby enabling the depositing substance to efficiently deposit to the metal surface exposed to the cooling water in the plant.

As with the first embodiment, during heating of the chemical solution, sharp increase in temperature of the chemical solution is suppressed, thereby allowing reduction in depositing substance concentration in the chemical solution to be suppressed, and enabling the depositing substance to efficiently deposit to the metal surface exposed to the cooling water in the plant.

In this embodiment, in order to detect the concentration of the chemical solution in the cooling water in the high temperature region and keep constant the concentration of the chemical solution, sharp reduction in depositing substance concentration in the cooling water can be suppressed, and the depositing substance concentration can be suppressed not to be the prescribed concentration or less. Accordingly, the depositing substance can efficiently deposit to the metal surface exposed to the cooling water in the plant.

Some embodiments of the present invention have thus been described above. However, these embodiments are provided as examples. There is no intention to limit the scope of the invention. These novel embodiments can be achieved in other various modes. In a range without deviating from the gist of the invention, various types of omission, replacement and modification can be made. These embodiments, modification thereof, and combinations of the embodiments are encompassed by the scope and gist of the invention, and included in the invention described in claims and the scope of equivalents thereof.

For instance, in the above description, the depositing substance is $TiO_2$, the chemical solution is $TiO_2$ colloidal solution. The depositing substance and the chemical solution may be other elements. For instance, the depositing substance may any substance that contains at least any one of zirconium oxide ($ZrO_2$), lead oxide (PbO), barium titanate ($BaTiO_3$), bismuth oxide ($Bi_2O_3$), zinc oxide (ZnO), tungsten oxide ($WO_3$), strontium titanate ($SrTiO_3$), iron oxide (III) ($Fe_2O_3$), ilmenite ($FeTiO_3$), potassium tantalate ($KTaO_3$), manganese titanate ($MnTiO_3$) and tin oxide ($SnO_2$). The chemical solution may be colloidal solution thereof. Even in such a case, it is assumed that advantageous effects equivalent to those of the first and second embodiments can be exerted.

The depositing substance may be a substance that contains at least any one of platinum (Pt), rhodium (Rh), ruthenium (Ru) and palladium (Pd). The chemical solution is an aqueous solution thereof. Even in such a case, it is assumed that advantageous effects equivalent to those of the first and second embodiments can be exerted.

What is claimed is:

1. A chemical solution injection system, comprising:
a chemical solution reservoir which stores a chemical solution containing a depositing substance to deposit to a member in contact with cooling water circulating in a plant and having a lower temperature than of the cooling water;
a plurality of heat exchangers connected in series and which exchange heat between the cooling water and the chemical solution;
a pipe connected to the plurality of heat exchangers and through which the chemical solution supplied from the chemical solution reservoir passes to be input into the plurality of heat exchangers;
a cooling water pipe connected to the plurality of heat exchangers and which guides the cooling water from an inside of the plant to the plurality of heat exchangers; and
a pump which conveys the chemical solution through the pipe,
wherein the chemical solution flows into the plurality of heat exchangers from a most upstream of the heat exchangers from the chemical solution reservoir and then flows into the plant, and
the cooling water flows into the plurality of heat exchangers from a most downstream of the heat exchangers from the chemical solution reservoir while heating the chemical solution to reduce a difference in temperature between the chemical solution and the cooling water.

2. The chemical solution injection system according to claim 1, wherein both ends of each of the plurality of heat exchangers into and from which the chemical solution flows are provided with valves subjected to open and close control, and the chemical solution passes through the plurality of heat exchangers or in parallel according to setting of the valves.

3. The chemical solution injection system according to claim 2, further comprising a bypass pipe which bypasses both the ends so as to prevent the chemical solution from passing through the plurality of heat exchangers.

4. The chemical solution injection system according to claim 2, further comprising:
   a first confluence section which causes the chemical solution to join from the heat exchanger on the downstream side among the plurality of heat exchangers into a high temperature region of the plant; and
   a second confluence section which causes the chemical solution to join from a heat exchanger different from the heat exchanger on the downstream side among the plurality of heat exchangers into the high temperature region of the plant.

5. The chemical solution injection system according to claim 1,
   wherein the pipe is provided with
   a chemical solution injection control valve which controls an inflow of the chemical solution into the cooling water in the plant,
   a thermometer which measures a temperature of the chemical solution flowing through the pipe, and
   a chemical solution injection controller which controls opening and closing of the chemical solution injection control valve, based on measurement by the thermometer.

6. The chemical solution injection system according to claim 5,
   wherein the chemical solution is a colloidal solution of titanium oxide, and
   when a difference in temperature between the chemical solution and the cooling water is 50° C. or less, the chemical solution injection controller opens the chemical solution injection control valve.

7. The chemical solution injection system according to claim 5,
   wherein the chemical solution is a colloidal solution of titanium oxide, and
   when the temperature of the chemical solution reaches a temperature allowing a temperature change of the chemical solution injected into the cooling water to be within 10° C./s, the chemical solution injection controller opens the chemical solution injection control valve.

8. The chemical solution injection system according to claim 1, further comprising:
   a concentration measurement unit which measures a concentration of the chemical solution in the cooling water in the plant; and
   a controller for an amount of chemical solution supply which controls the amount of chemical solution supply from the chemical solution reservoir to the pipe based on measurement by the concentration measurement unit.

9. A chemical solution injection method, comprising:
   storing a chemical solution containing a depositing substance to deposit to a member in contact with cooling water circulating in a plant and having a lower temperature than the cooling water has;
   causing the chemical solution to flow into a plurality of heat exchangers connected in series from a most upstream of the heat exchangers from a chemical solution reservoir through a pipe connecting to the plurality of heat exchangers;
   causing the cooling water to flow into the plurality of heat exchangers connected in series from a most downstream of the heat exchangers through a cooling water pipe connected to the plurality of heat exchangers; and
   injecting the heated chemical solution into the cooling water in the plant.

* * * * *